United States Patent [19]
Brilman

[11] Patent Number: 5,895,666
[45] Date of Patent: Apr. 20, 1999

[54] DEVICE FOR REMODELLING A HOLLOW OBJECT

[75] Inventor: Gerrit Willem Brilman, Bathmen, Netherlands

[73] Assignee: Thomassen & Drijver-Verblifa B.V., Deventer, Netherlands

[21] Appl. No.: 08/910,554

[22] Filed: Aug. 18, 1997

[30] Foreign Application Priority Data

Aug. 19, 1996 [NL] Netherlands ............................ 1003827

[51] Int. Cl.⁶ .................................................. B21D 26/08
[52] U.S. Cl. .................................... 425/1; 72/56; 72/62
[58] Field of Search ........................ 425/1, 387.1, 392;
72/56, 62, 430, 706

[56] References Cited

U.S. PATENT DOCUMENTS

| | | | |
|---|---|---|---|
| 3,252,312 | 5/1966 | Maier | 72/56 |
| 3,394,569 | 7/1968 | Smith | 72/56 |
| 3,908,419 | 9/1975 | Brownbill | 72/56 |
| 5,187,962 | 2/1993 | Bilko et al. | 72/62 |
| 5,419,171 | 5/1995 | Bumgarner | 72/56 |
| 5,585,066 | 12/1996 | Weiss | 264/526 |

FOREIGN PATENT DOCUMENTS

| | | | |
|---|---|---|---|
| 0655314 | 5/1995 | European Pat. Off. | |
| 45-11420 | 4/1970 | Japan | 425/1 |
| 46-1850 | 1/1971 | Japan | 72/56 |
| 5-309726 | 11/1993 | Japan. | |
| 7-39958 | 2/1995 | Japan. | |
| 95-08410 | 3/1995 | WIPO. | |

*Primary Examiner*—Robert Davis
*Attorney, Agent, or Firm*—Webb Ziesenheim Bruening Logsdon Orkin & Hanson, P.C.

[57] ABSTRACT

A device for expandingly remodelling a hollow object consisting of a body with a mouth opening and a bottom, for instance a metal can, a blown plastic, for instance PET, bottle or the like, includes: a mould comprising two mould parts, which mould parts are relatively movable between a closed position, in which they bound a mould cavity having a form which corresponds with the desired final form of an object, and an open position in which an object for remodelling can be placed and a remodelled object can be removed; sealing means for sealing the mouth opening against the wall of the closed mould cavity; compression means for increasing the pressure in the object placed in the closed mould cavity such that the object is thereby expanded against the wall of the mould cavity; decompression means for subsequently decreasing this pressure such that the mould parts can be moved to their open position in which a remodelled object can be removed; and has the feature that the decompression means are adapted to temporarily store at least a part of the energy coming available during the decompression and can co-act with the compression means such that at least a part of the stored energy is used for operation of the compression means.

11 Claims, 5 Drawing Sheets

5,895,666

1

DEVICE FOR REMODELLING A HOLLOW OBJECT

BACKGROUND OF THE INVENTION

The invention relates to a device for expandingly remodelling a hollow object consisting of a body with a mouth opening and a bottom, for instance a metal can, a blown plastic, for instance PET, bottle or the like, which device comprises:

- a mould comprising two mould parts, which mould parts are relatively movable between a closed position, in which they bound a mould cavity having a form which corresponds with the desired final form of an object, and an open position in which an object for remodelling can be placed and a remodelled object can be removed;
- sealing means for sealing the mouth opening against the wall of the closed mould cavity;
- compression means for increasing the pressure in the object placed in the closed mould cavity such that the object is thereby expanded against the wall of the mould cavity;
- decompression means for subsequently decreasing this pressure such that the mould parts can be moved to their open position in which a remodelled object can be removed.

Such a device is known from PCT International Publication Number WO-A-95/08410.

The known device makes use of supply of an explosive mixture into the object. By igniting thereof an internal pressure increase takes place which causes the object to expand and to assume a form which corresponds with that of the wall of the mould cavity. A pressure equalization with the ambient then takes place which is accompanied by a considerable noise production. The energy generated by the explosion is wholly lost in this manner.

It is an object of the invention to embody a device of the described type such that the noise production is considerably reduced and at least a part of the energy developed in exerting internal pressure is retained for the purpose of building up pressure in a following cycle for remodelling a subsequent object.

SUMMARY OF THE INVENTION

The stated objectives are generally realized with a device which has the feature that the decompression means are adapted to temporarily store at least a part of the energy coming available during the decompression and can co-act with the compression means such that at least a part of the stored energy is used for operation of the compression means.

A particular embodiment is characterized by a feed for gas, for instance air, which feed is connected to a cylinder in which a piston movable by drive means is sealingly slidable.

A very high compression ratio can be achieved with an embodiment in which a front part of the piston extends into the can in an extreme compression position.

A very practical embodiment which is naturally suitable for storing energy has the feature that the drive means comprise flywheel means.

Another embodiment has the special feature that the drive means comprise curve means. This embodiment comprises a curve track which co-acts with a curve follower which is guided positively by the curve track and is movable relative thereto. The curve follower is coupled to said piston to impart a reciprocating movement thereto.

2

A preferred embodiment has a feed for gaseous explosive mixture into the object, ignition means for igniting this mixture and discharge means for combustion gases.

This embodiment can have the advantage that after the device has been set into operation with external energy the successive explosions provide sufficient energy not only to remodel the objects but also to keep the whole process in motion. In this manner the explosions are as it were used in the manner of an internal combustion engine. In this manner the device will itself sustain its own operation.

A very effective variant has the feature that the ignition means are adapted to operate in the region of the extreme compression position.

In order to prevent undesired opening of the mould during compression the device can advantageously have the feature that at least two mould parts together bounding the peripheral wall of the mould cavity are movable at least more or less radially relative to the mould cavity and that locking means are present for locking relative to at least one other mould part during pressure build-up.

In order to prevent irregularities in the remodelled object the device is preferably characterized by at least one pressure equalization conduit debouching on the wall of the mould cavity.

A specific embodiment has the special feature that the device is of the rotating type.

BRIEF DESCRIPTION OF THE DRAWINGS

The invention will now be elucidated with reference to the annexed drawings. Herein.

DESCRIPTION OF THE PREFERRED EMBODIMENT

Figure 1:
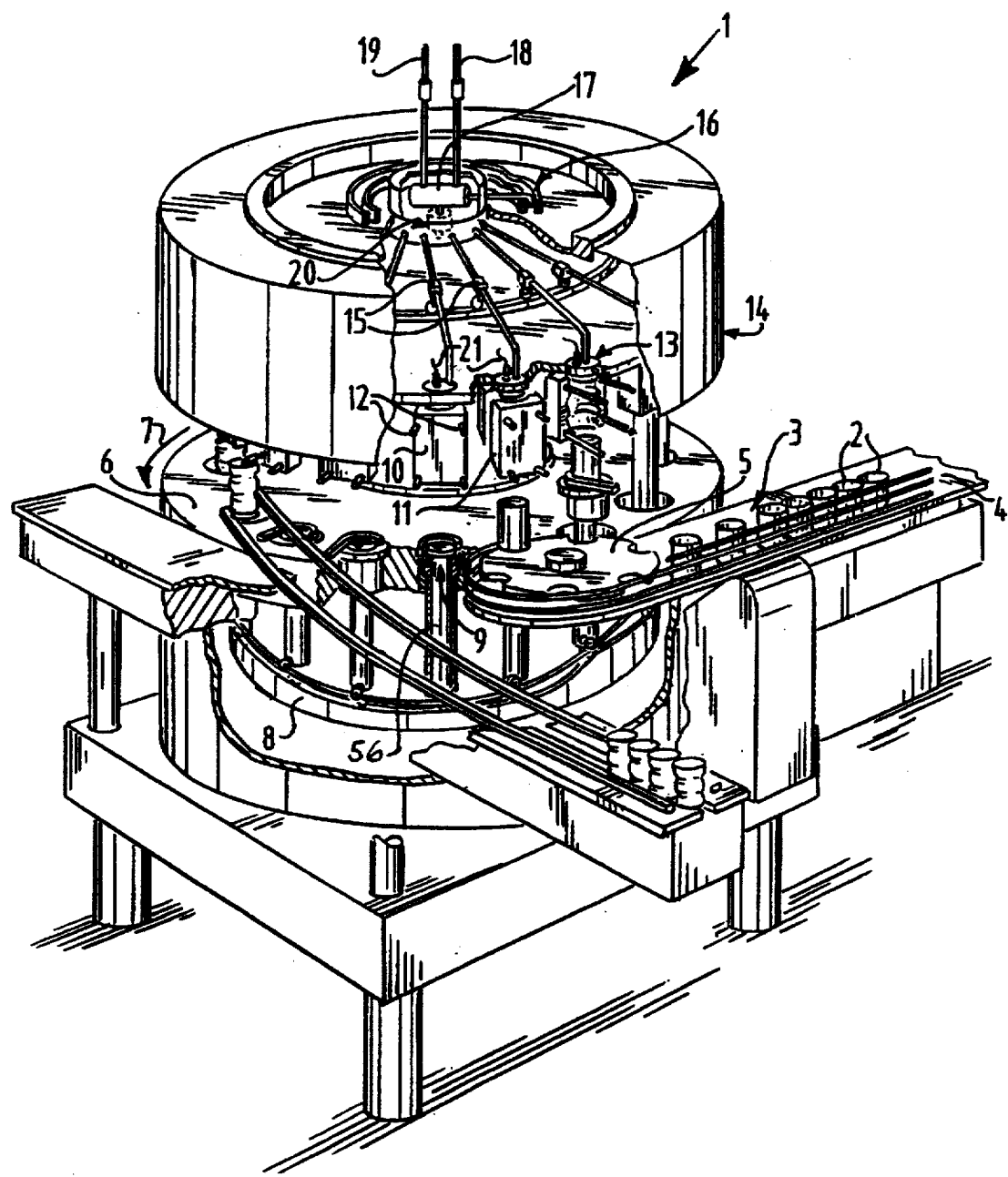
FIG. 1 is a cut away perspective view of a device in which no energy recovery means are shown.

FIG. 1 shows a device 1 for expandingly remodelling metal cans.

Cans 2 are spaced by a rotating screw 3 (not shown) after supply via a conveyor belt 4 and placed via a star wheel 5 onto a rotating platform 6 which rotates as according to arrow 7. During rotation a support table 9 is moved upward by means of a curve 8 whereby a can is placed in an opened mould 10. As FIG. 1 shows, an outer movable mould part 11 is guided via guide pins 12. Without stating the per se apparent relationship, brief reference is now made to the reference numerals used in FIG. 1.

13 upper seal 14 safety screen 15 three-way valve for feed of explosive mixture and discharge of combustion gases for each station individually 16 cam and follower mechanisms for valve units 15

17 three-way valve system for collective feed of all stations with explosive mixture
18 supply of combustible gas
19 supply of air or oxygen
20 rotating coupling and seal
21 electrical connection for ignition system
56 outer lifting device for cans 2. This is also operated by a curve follower.

Figure 2:
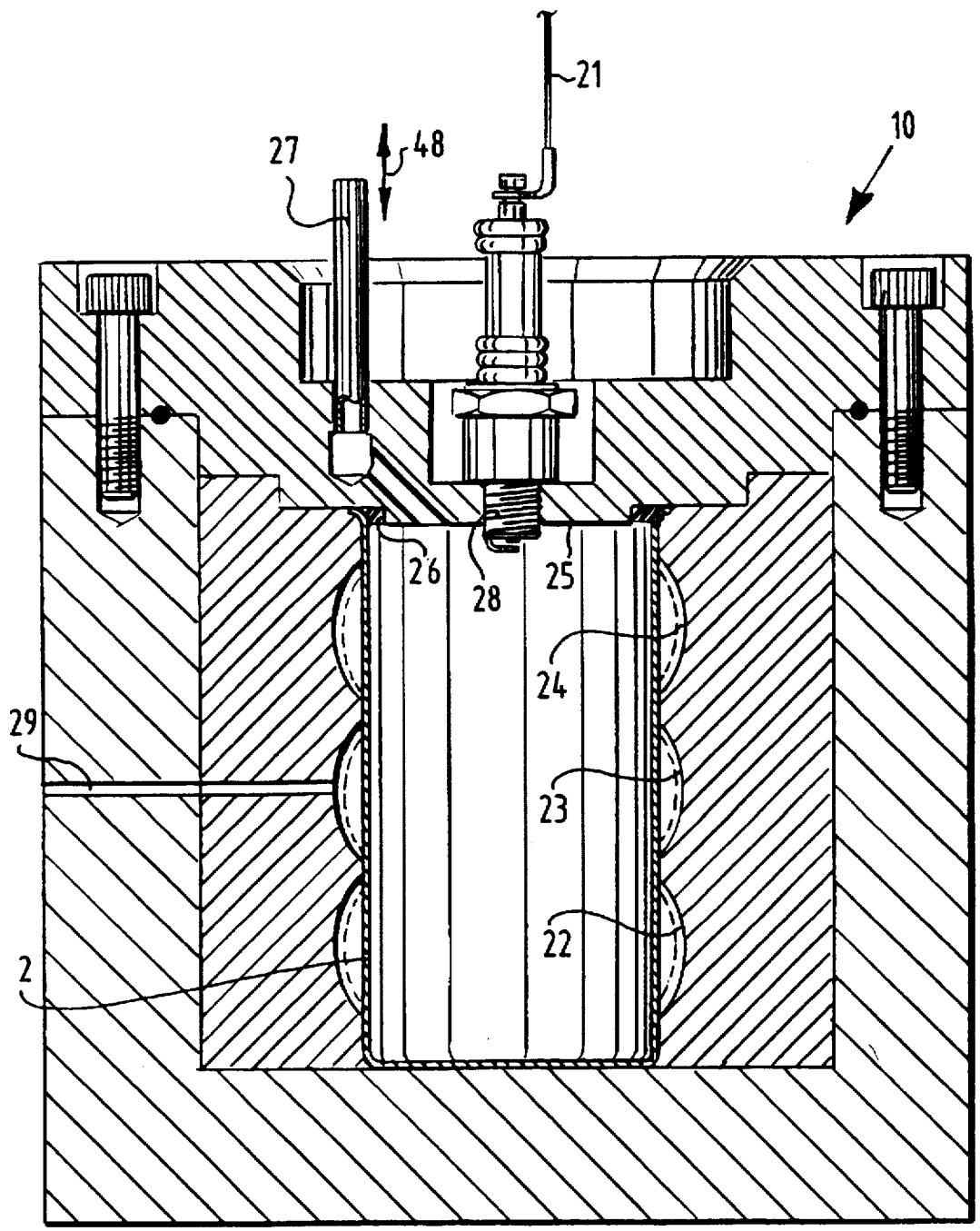
FIG. 2 shows a cross section through a mould drawn in closed position which forms part of the device of FIG. 1.

FIG. 2 shows by way of example a mould cavity with three annular recesses 22, 23, 24. A can 2 is placed in the mould cavity while leaving clear space such that the can, which is manufactured for instance of tin plate or aluminium, can expand under internal pressure. The mould cavity is closed in the drawn manner for this purpose. On the side of mouth opening 25 is arranged a sealing ring 26 such that the interior of can 2 is completely sealed. Via a feed 27 for explosive mixture such a mixture, consisting for instance of acetylene or methane and oxygen or air, can be admitted into can 2. A sparking plug 28 is then energized. Due to the spark occurring there the explosive mixture explodes and owing to the pressure occurring in the can this can is plastically deformed into the state indicated schematically with dashed lines. The combustion gases are again discharged through the feed 27 now serving as discharge. A pressure equalization conduit 29 ensures that the air which has intruded between the outer wall of the can and the recesses 22, 23, 24 can escape to the outside.

As already stated, no use is made in the embodiments of FIGS. 1 and 2 of energy recovery.

Figure 3:
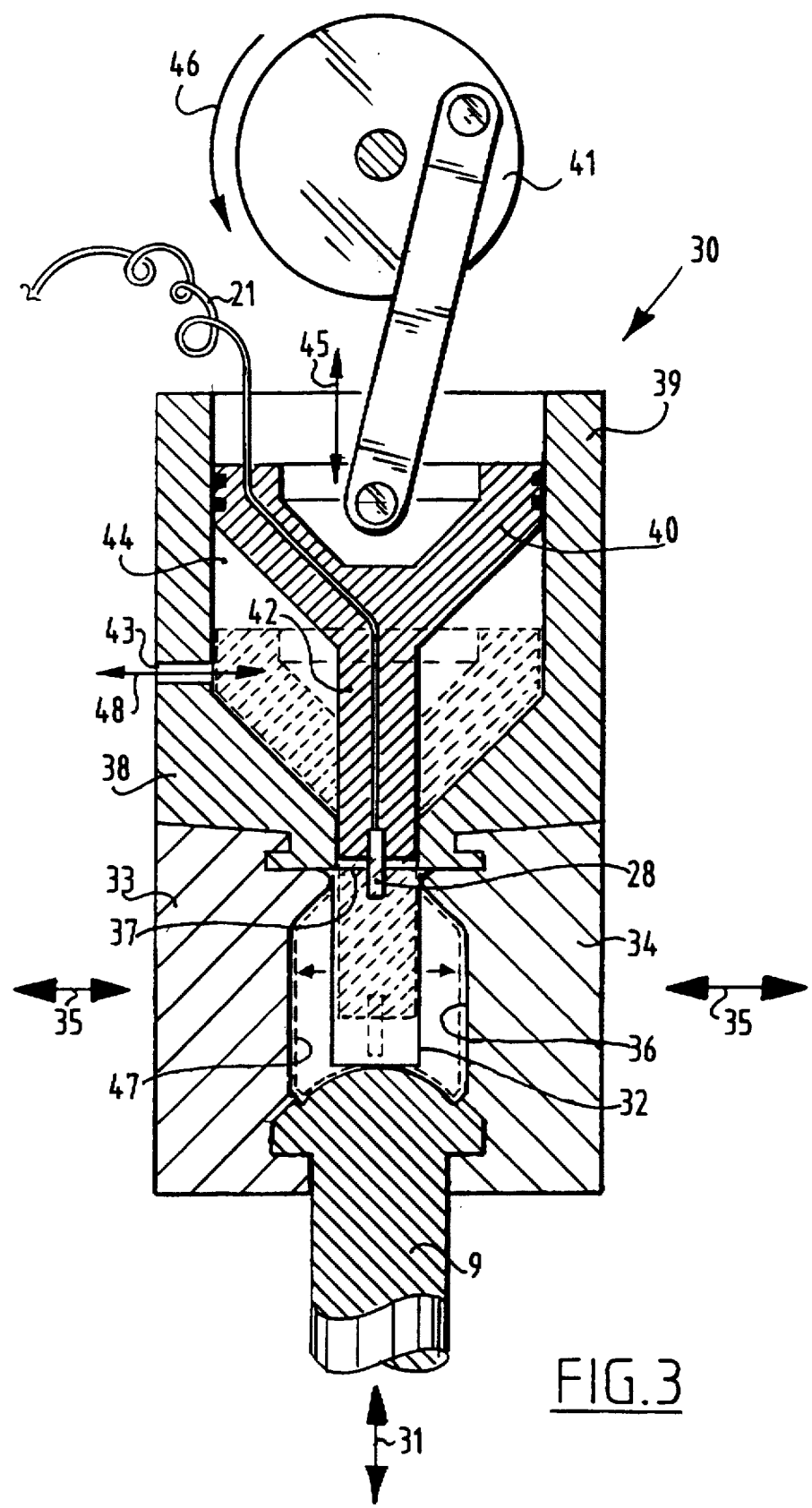
FIG. 3 is a view corresponding with FIG. 2 of a device according to the invention.

FIG. 3 shows a part of a device 30.

Device 30 comprises the support table 9 which is movable up and downward as according to arrow 31. After a can 32 has been moved upward therewith the mould parts 33, 34 are moved toward each other as according to arrows 35 such that can 32 is wholly enclosed by the wall of mould cavity 36 and mouth opening 37 seals against mould part 38. It is noted that the co-action between said mould parts in the manner shown in FIG. 3 prevents a relative vertical displacement. Mould part 38 comprises a cylinder 39 in which a piston 40 is movable up and downward. The piston is connected to a schematically depicted flywheel device 41.

Piston 40 has a cylindrical protruding bottom part 42 which in the lowest position during rotation of flywheel 41 can extend a considerable distance into can 32. This latter position is indicated with broken lines. In the situation designated with full lines an explosive mixture is admitted via feed 43 into cylinder space 44. When cylinder 40 is moved downward as according to arrow 45 there takes place compression of this mixture and effective feed to and distribution in the space which is bounded by the inner surface of can 32 and the outer surface of the cylindrical bottom part 42. In the vicinity of the lowest part of the rotation stroke (arrow 46) of flywheel 41 ignition of sparking plug 28 takes place whereby can 32 expands and acquires the form corresponding with the drawn wall of mould cavity 36. In this respect is noted that for the sake of clarity of the drawing the expansion is drawn in somewhat exaggerated proportions. The remodelled can 47 is indicated with broken lines. The pressure increase occurring during the explosion not only results in the can 32 undergoing an expanding remodelling to the shape designated with 47 but also in piston 40 being subjected via part 42 to a substantial upward directed force which imparts extra rotation energy to flywheel 41 which meanwhile has passed its dead centre position.

It will be apparent that in the manner indicated a simple energy recovery is realized which, using an explosive mixture and sparking plug 28, provides device 30 with a self-sustaining character.

The feed 43 also serves for discharge of combustion gases. This is indicated symbolically with an arrow 48 pointing in two directions.

Attention is drawn to the fact that the device can also operate without use of an explosive mixture and ignition thereof. In that case the device is not provided with the feed/discharge and with sparking plug 28 with connection 21. Flywheel 41 must then be driven by external motor means. It will be apparent that in that case the device cannot be self-sustaining, at least not as far as the energy recovery during the transition from compression to expansion is concerned.

Figure 4:
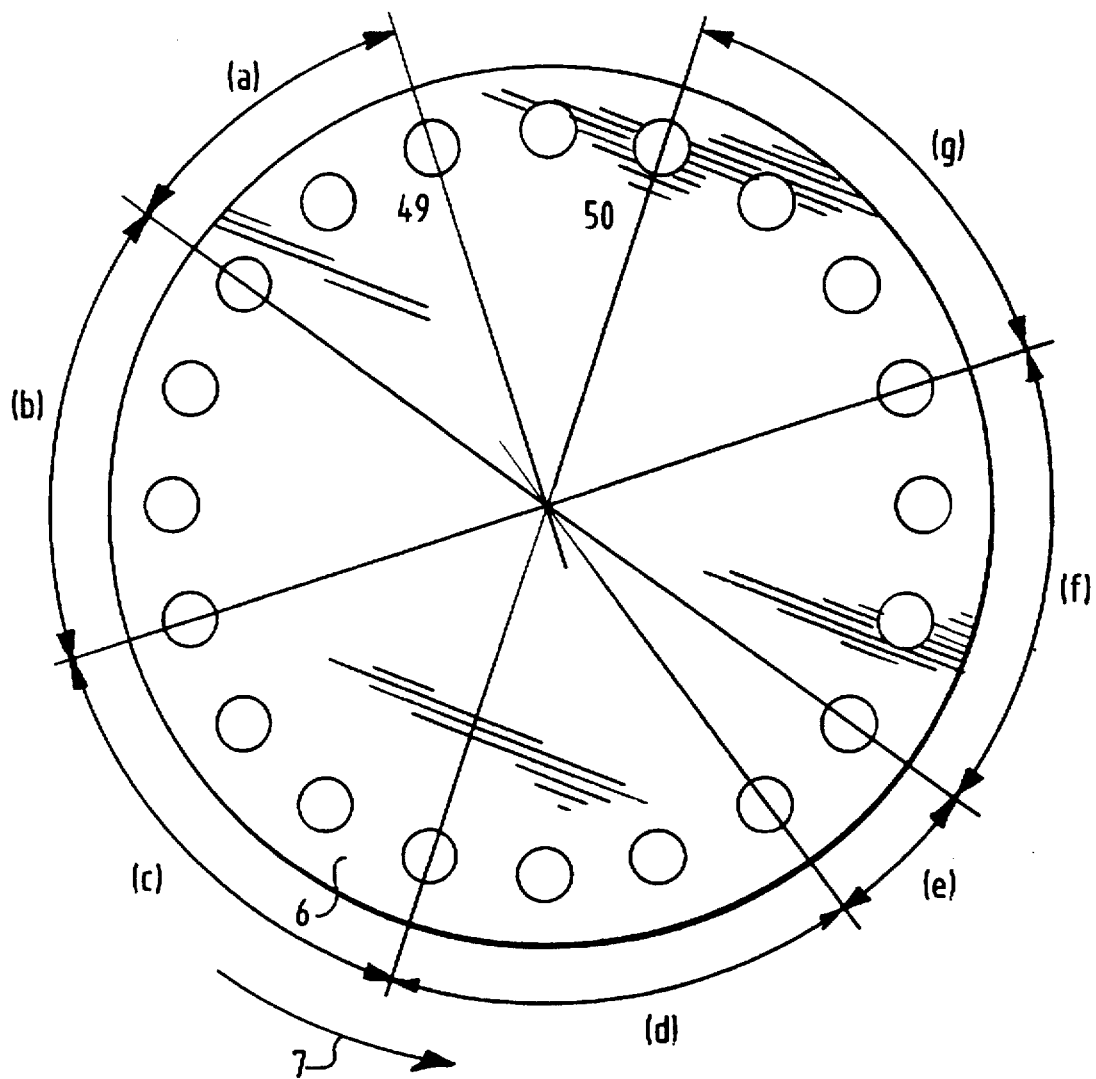
FIG. 4 shows a schematic top view of the carrousel of FIG. 1, wherein the diverse segments correspond with the diverse successive stages of a processing cycle.

FIG. 4 shows the different processing stages. In position 49 the cans are fed in. During the first stage (a) positioning takes place through an angle of 36°. In stage (b) upward displacement of a can takes place through an angle of 54°. In stage (c) the mould is closed during an angular displacement of 54°. In stage (d) compression takes place over 54°. In stage (e) ignition and expansion take place through an angle of 18°. In stage (f) a mould is opened over an angle of 54°. In stage (g) the remodelled can is displaced downward through an angular displacement of 54° to be discharged at position 50.

Figure 6:
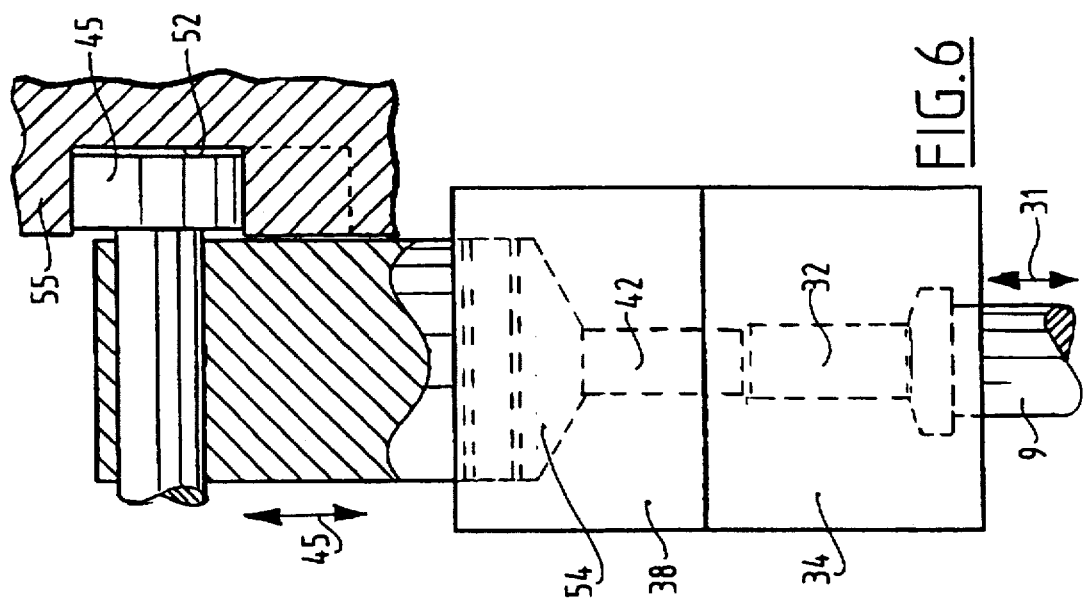
FIG. 6 shows a cross section through the variant of FIG. 5.
Figure 5:
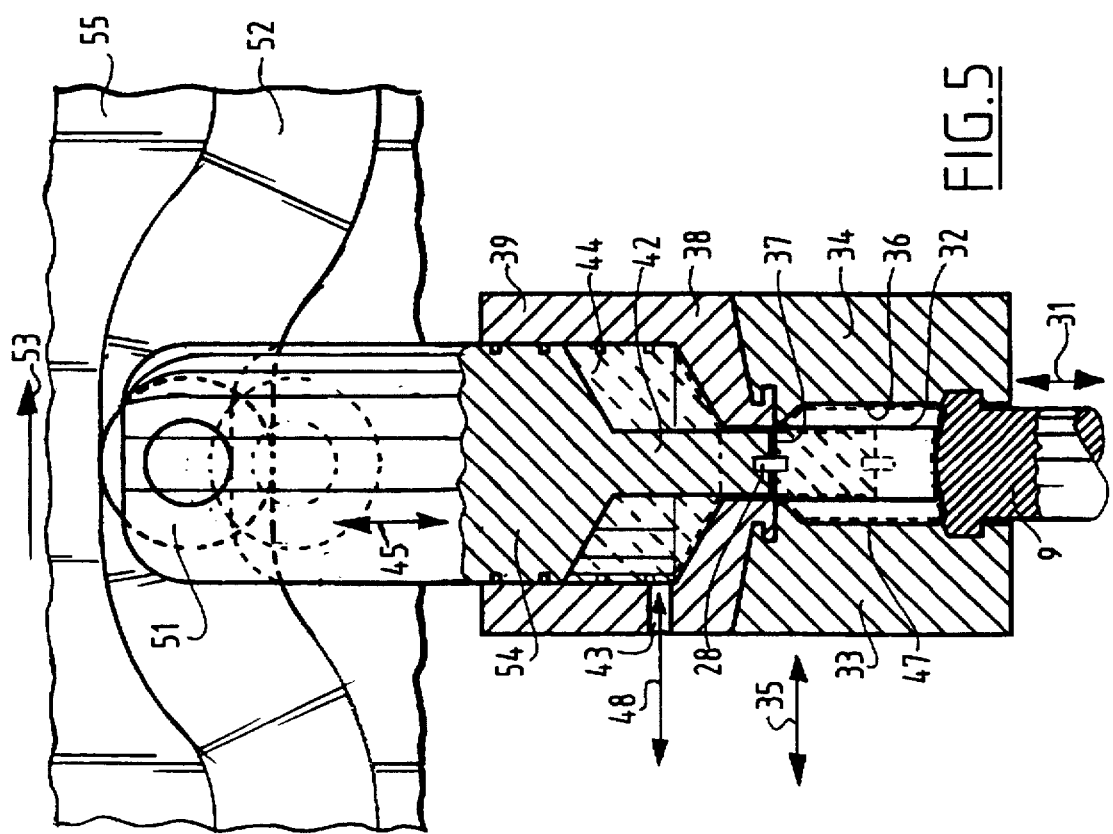
FIG. 5 is a partial view corresponding with FIG. 3 of a variant.

The variant according to FIGS. 5 and 6 corresponds partially with the embodiment of FIG. 3. Corresponding elements are therefore designated in FIGS. 5 and 6 with the same reference numerals as in FIG. 3. It is noted that FIGS. 5 and 6 are somewhat schematic. For instance the electric cable 21 for power supply to sparking plug 28 has not been drawn.

Otherwise than piston 40 of FIG. 3, piston 54 of FIGS. 5 and 6 is controlled for up and downward movement 45 not by a flywheel 41 but by a curve follower 51. This curve follower 51 co-acts for positive control with a curve track 52 which, as shown clearly in FIG. 6, is embodied as a groove in a cylinder rotatably driven for instance as according to arrow 53.

In the situation shown in FIGS. 5 and 6 the piston 54 is situated in its highest position. With continued displacement of cylinder 55 as according to arrow 53 curve follower 51 is urged downward with corresponding downward directed displacement of cylinder 54 as according to arrow 45. The lowered position of the bottom part 42 of piston 54 likewise shown in FIG. 3 is hereby reached. In can 32 is then situated a compressed explosive mixture which can be combusted by energizing sparking plug 28. The expansion to can 47 is hereby realized.

During this expansion piston 54 is subjected to an upward directed displacement by the explosion of the explosive mixture. This enhances the movement of cylinder 55 since, due to the adapted wave shape of curve track 52, the curve follower 51 has then just passed through the lowest point of curve track 52 and is situated in an upward directed part thereof. Due to the associated incline of curve track 52 the upward directed displacement of curve follower 51 is converted into a power thrust in the direction of arrow 53.

Attention is drawn to the fact that FIG. 5 in particular is drawn somewhat schematically and not in the correct proportions. The feed of combustible mixture to the interior of can 32 via opening 53 takes place from the top. In the highest position of piston 54 there is therefore a passage which ensures supply of the combustible mixture via opening 43 to the relevant space. This access can be embodied in the manner of FIG. 3 but alternatively it is also possible to opt for a passage through piston part 42, for instance in combination with a non-return valve. After description of FIG. 3 and the foregoing explanation it will however be apparent that different technical options are available to realize the stated objective.

The described device can be wholly self-sustaining after a start-up period. It will be apparent that the speed at which the device operates must remain limited within certain values. In addition, the various successive stages must be mutually adjusted in time with a certain precision. The explosion of an explosive mixture must for instance only take place after a dead centre zone has been passed, whereby the explosion energy not used for deforming the can can enhance the continued displacement of a flywheel, carrousel, curve cylinder or the like. When there is surplus energy after an explosion this can be converted into for instance electrical energy. The flywheel, which rotates at a more or less constant rotation speed, can for instance be coupled to an electric generator which can be controlled with known electronic means such that it makes the surplus energy easy to use, for instance feeds it back to the mains electricity supply. The electronic control in question can then be used effectively to control the speed with which the device operates.

I claim:

1. A device for expandingly remodeling a hollow object consisting of a body with a mouth opening and a bottom, which device comprises a mould comprising two mould parts, which mould parts are relatively movable between a closed position, in which they bound a mould cavity having a form which corresponds with the desired final form of an object, and an open position in which an object for remodeling can be placed and a remodeled object can be removed;

sealing means for sealing the mouth opening against the wall of the closed mould cavity;

compression means for increasing the pressure in the object placed in the closed mould cavity such that the object is thereby expanded against the wall of the mould cavity; and decompression means for subsequently decreasing this pressure such that the mould parts can be moved to their open position in which a remodeled object can be removed;

wherein the decompression means are adapted to temporarily store at least a part of the energy coming available during the decompression and can co-act with the compression means such that at least a part of the stored energy is used for operation of the compression means.

2. The device according to claim 1, further including a feed for gas, which feed is connected to a cylinder in which a piston movable by drive means is sealingly slidable.

3. The device according to claim 2, wherein a front part of the piston extends into the can in an extreme compression position.

4. The device according to claim 2, wherein the drive means comprise flywheel means.

5. The device according to claim 2, wherein the drive means comprise curve means.

6. The device according to claim 1, further including a feed for gaseous explosive mixture into the object, ignition means for igniting this mixture and discharge means for combustion gases.

7. The device according to claim 2, wherein the ignition means are adapted to operate in the region of the extreme compression position.

8. The device according to claim 1, wherein at least two mould parts together bounding the peripheral wall of the mould cavity are movable radially relative to the mould cavity and that locking means are present for locking relative to at least one other mould part during pressure build-up.

9. The device according to claim 1, further including at least one pressure equalization conduit debouching on the wall of the mould cavity.

10. The device according according to claim 1, wherein the device further includes a rotating platform upon which the hollow object is transported to the mould, sealing means, compression means and decompression means.

11. The device according to claim 3, wherein the ignition means are adapted to operate in the region of the extreme compression position.

* * * * *